(12) United States Patent
de Goycoechea

(10) Patent No.: US 11,916,584 B2
(45) Date of Patent: Feb. 27, 2024

(54) ANTENNA DISCONNECTION DETECTION

(71) Applicant: Fiplex Communications, Inc., Doral, FL (US)

(72) Inventor: Ricardo Matias de Goycoechea, Cordoba (AR)

(73) Assignee: Fiplex Communications, Inc., Doral, FL (US)

( * ) Notice: Subject to any disclaimer, the term of this patent is extended or adjusted under 35 U.S.C. 154(b) by 247 days.

(21) Appl. No.: 17/465,502

(22) Filed: Sep. 2, 2021

(65) Prior Publication Data

US 2022/0069858 A1 Mar. 3, 2022

Related U.S. Application Data

(60) Provisional application No. 63/073,689, filed on Sep. 2, 2020.

(51) Int. Cl.
*H04B 1/18* (2006.01)
*H04B 17/345* (2015.01)
*H04B 17/10* (2015.01)

(52) U.S. Cl.
CPC ............. *H04B 1/18* (2013.01); *H04B 17/102* (2015.01); *H04B 17/345* (2015.01)

(58) Field of Classification Search
CPC ........ H04B 1/18; H04B 17/102; H04B 17/345
USPC ........................................................ 375/262
See application file for complete search history.

(56) References Cited

U.S. PATENT DOCUMENTS

2016/0087339 A1* 3/2016 Bull ................... H04W 16/28
342/367
2021/0281334 A1* 9/2021 Li ....................... H04L 25/0226

* cited by examiner

*Primary Examiner* — Fitwi Y Hailegiorgis
(74) *Attorney, Agent, or Firm* — Rafael Perez-Pineiro; The Brickell IP Group, PLLC

(57) ABSTRACT

A system for detecting whether an antenna has been disconnected from a coverage extension system is disclosed. The system for detecting disconnected antennas includes an antenna receiving signals from a base station and noise from the environment; a coupler; a transceiver; a power sensor to measure the power intensity of the noise; a controller; and a wired connector, electrically connecting the output of the antenna to the coupler, for carrying said signals and white noise from the antenna to the coupler. The coupler outputs part of the signal and noise to the power sensor and another part of the signal and noise to the transceiver. The controller detects changes in the power intensity of the noise to detect whether the antenna has been disconnected.

15 Claims, 4 Drawing Sheets

ANTENNA DISCONNECTION DETECTION

CROSS REFERENCE TO RELATED APPLICATIONS

This application claims the benefit of U.S. Provisional Application No. 63/073,689 filed Sep. 2, 2020, the disclosure of which is hereby incorporated herein by reference in its entirety.

FIELD OF THE DISCLOSURE

This disclosure relates generally to communication systems for distributing signals in a communications network.

BACKGROUND

In order to extend the communications of any wireless system inside areas without signal coverage, Bidirectional Amplifiers, also called BDAs or Signal Boosters, or Distributed Antenna Systems, also called DAS or Fiber DAS systems, are deployed. The Bidirectional Amplifiers and the Distributed Antenna Systems pick up the signals transmitted by Base Stations in the downlink direction, amplifying and transmitting the signals to radios or terminal units that are located within the area with poor or without coverage (i.e., areas where the direct signals from the base station are weak). The Bidirectional Amplifiers and the Distributed Antenna Systems also pick up signals transmitted by the radios or terminal units that are located within the area without coverage in the uplink direction, amplifying and transmitting those signals to the Base Station. This is the basic concept in which any coverage extension solution works. A coverage extension system may also include other components such as antennas, coaxial cables, and splitters, among others, and the failure of any of these components causes a failure or degradation in the overall system performance. There are several standards, codes, and recommendations about how to measure the status of most of the components of a coverage extension solution, but some complexity arises when trying to determine the operational status of the antennas that are used in the system. If an antenna is disconnected, then the system may lose the capacity to receive and/or transmit the signals, which does not allow the wireless system to properly extend signal coverage the radios or terminal units in the indoor area.

There are several existing solutions available to determine the operational status of the antennas of a signal coverage extension system. One such solution consists on injecting a DC current into the coaxial cable that connects the Signal Booster or DAS Master Unit or DAS Remote Unit with the antenna, and providing the antenna with a current consumption device, such as a resistor or similar power consumption device, or any other power consuming device or component (e.g., a polarized transistor or active circuit that consumes current) that may be detected by the BDA or DAS and that can be embedded into the antenna structure or can be plugged into the antenna structure. The Signal Booster or DAS Master Unit or DAS Remote Unit may sense the current consumption level, and in the event that no current consumption it detected, then it can be determined that the antenna with the current consumption device is not connected at the other end of the coaxial cable. One disadvantage of this solution is that it requires injecting DC voltage into the coaxial cable and also requires the use of a power supply, a current injector, and a current consumption device to be used with the antenna, or it would require an antenna with the embedded current consumption device.

Another solution consists in the Signal Booster or DAS Master Unit or DAS Remote being capable to sense the presence of RF signals received by the antennas in the uplink or downlink direction, for example, and in the event that no signals from the antenna are detected, then the Signal Booster (which may be a smart device like a Master Unit or a Remote Unit in a DAS) or DAS Master Unit or DAS Remote Unit would determine that there is no antenna properly connected to properly receive the signals transmitted in the downlink direction. One disadvantage of this solution is that not all wireless systems constantly have signals on the air (i.e., there is no wireless communication at all times), and the lack of detection of signals at all times does not mean that the antenna is not properly connected or not operational. The non-detection of signals due to signals not being transmitted at all times can lead to a determination by the Signal Booster or DAS Master Unit or DAS Remote that there is no antenna connected, providing a false alarm. Some manufacturers provide an adjustable timer prior to triggering an alarm, providing enough time to sense the signals every time they are on the air, which provides the Signal Booster or DAS Master Unit or DAS Remote Unit with a delay between the time of not sensing the received signals from antennas to trigger the alarm. If the timer is set to a large time delay, then it will not provide an alarm output in the event an antenna is disconnected within the delay period, and if the timer is set to a low time delay, then the alarm will be triggered under low network usage scenarios (e.g., during weekends or at night).

Another solution consists of having the Signal Booster or DAS Master Unit or DAS Remote Unit sense the voltage standing wave ratio (VSWR) generated when the antenna is being disconnected and the coaxial cables are impedance unmatched. This solution only works well when the Signal Booster or DAS Master Unit or DAS Remote Unit is transmitting a signal that can be reflected, and also if the length of the coaxial cable is not so large as to make the losses not to attenuate the direct and reflected signals in order the Signal Booster or DAS Master Unit or DAS Remote can really measure the impedance mismatch. That is, there are some solutions that involve measuring the reflection of the signals being transmitted because there is no antenna connected; specifically, the signal booster transmits towards the donor antenna the amplified uplink signals, but the signals at the end of the coaxial cable don't find an antenna but instead find an open circuit (impedance mismatch) so the uplink signals are reflected, and the BDA reads or interprets that reflection as no antennas being connected. There are several factors that make this method unprecise, such as an antenna with a not so good input impedance that may generate some reflection even with the antenna being connected, or a long coaxial cable that will attenuate the reflected signals and the signal booster not being capable of measuring that attenuated reflected signal and thus not being able to determine the antenna disconnection, among other limitations of this technique.

Therefore, there is a need in the art for an improved method and system for detecting disconnected antennas in a wireless coverage extension system.

BRIEF SUMMARY OF THE DISCLOSURE

The following presents a simplified summary of the disclosure in order to provide a basic understanding of some aspects of the various embodiments disclosed herein. This summary is not an extensive overview of every detail of every embodiment. It is intended to neither identify key or critical elements of every embodiment nor delineate the scope of every disclosed embodiment. Its sole purpose is to present some concepts of disclosure in a simplified form as a prelude to the more detailed description that is presented later.

In one embodiment of the disclosure a system for detecting whether an antenna has been disconnected is provided.

A system for detecting whether an antenna has been disconnected from a coverage extension system is disclosed. The system for detecting disconnected antennas includes an antenna receiving signals from a base station and noise from the environment; a coupler; a transceiver; a power sensor to measure the power intensity of the noise; a controller; and a wired connector, electrically connecting the output of the antenna to the coupler, for carrying said signals and white noise from the antenna to the coupler. The coupler outputs part of the signal and noise to the power sensor and another part of the signal and noise to the transceiver. The controller detects changes in the power intensity of the noise to detect whether the antenna has been disconnected.

The following description and annexed drawings set forth certain illustrative aspects of the disclosure. These aspects are indicative, however, of but a few of the various ways in which the principles disclosed may be employed. Other advantages and novel features disclosed herein will become apparent from the following description when considered in conjunction with the drawings.

BRIEF DESCRIPTION OF THE FIGURES

The drawings, in which like numerals represent similar parts, illustrate generally, by way of example, but not by way of limitation, various embodiments discussed in the present document.

DETAILED DESCRIPTION OF THE DISCLOSURE

The foregoing summary, as well as the following detailed description of certain embodiments of the subject matter set forth herein, will be better understood when read in conjunction with the appended drawings. In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that variations may be made without departing from the scope of the subject matter disclosed herein. It should also be understood that the drawings are not necessarily to scale and in certain instances details may have been omitted, which are not necessary for an understanding of the disclosure, such as details of fabrication and assembly. Furthermore, references to "one embodiment" are not intended to be interpreted as excluding the existence of additional embodiments that also incorporate the recited features. The following detailed description is, therefore, not to be taken in a limiting sense, and the scope of the subject matter disclosed herein is defined by the appended claims and their equivalents.

Figure 1:
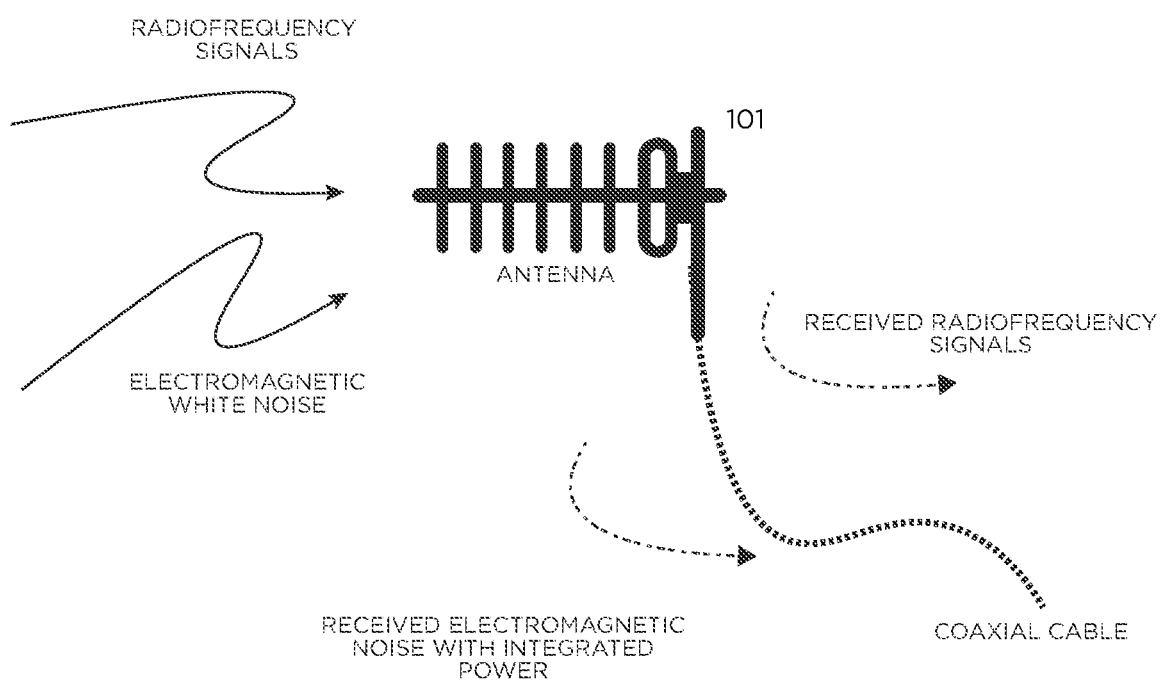
FIG. 1 illustrates an antenna that is receiving on-air signals intended for a receiver and white noise.

FIG. 1 shows an antenna 101 that is receiving the on-air signals 103 intended for a receiver. At the same time, the antenna picks up electromagnetic white noise 105 which is also present in the air due to atmospheric noise and other electrical devices. The electromagnetic white noise received by the antenna has a certain integrated power level, which is also referred to the constant power spectral density.

Figure 2:
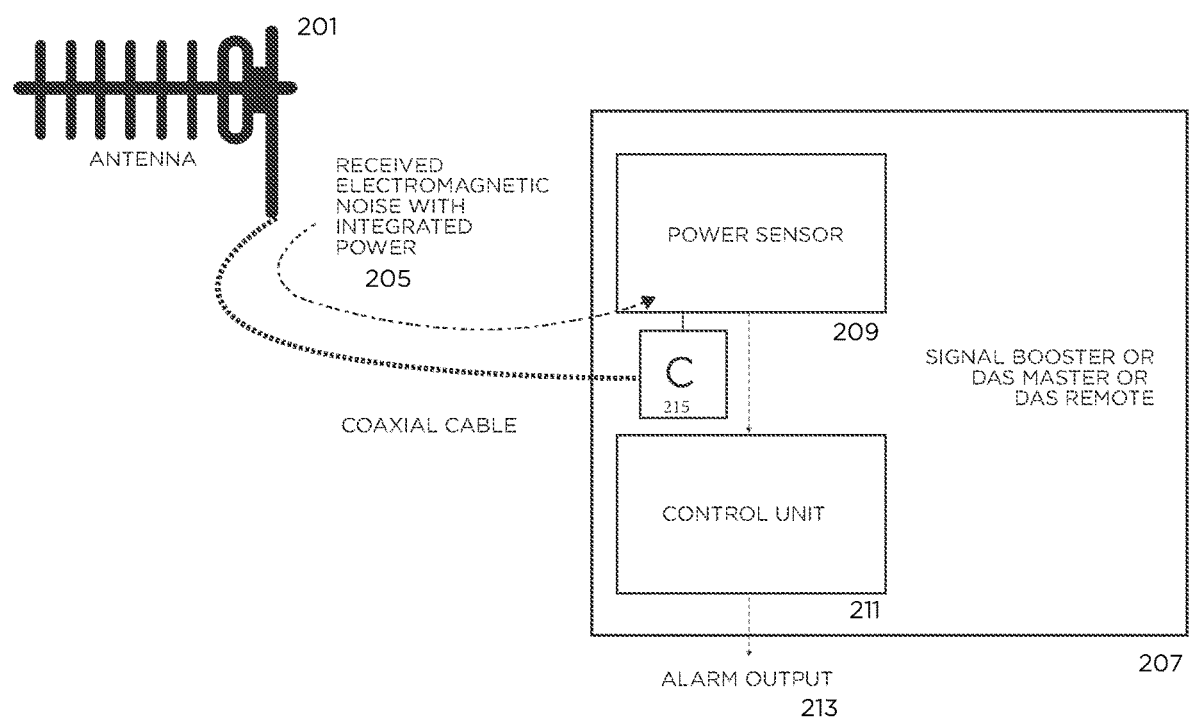
FIG. 2 illustrates a coverage extension system including a signal booster, DAS master unit or DAS remote unit with an integrated power sensor and control unit.

FIG. 2 shows a Signal Booster or DAS Master Unit or DAS Remote Unit 207 connected to at least one antenna 201. The Signal Booster or DAS Master Unit or DAS Remote Unit 207 may include a power sensor 209 that is capable of measuring the received electromagnetic white noise integrated power 205, and may also include a control unit 211 that compares the output of the power sensor with a reference value. For example, that reference value may be determined by the installer at the moment of installation of the antenna and commissioning the system, which could be set as the value obtained by the reading of the white noise at the moment of installation. After the antenna 201 has been installed, if at a later time something happens with the antenna 201 (it becomes defective or disconnected) then the noise 205 being received by the sensor 209 (via coupler 215) will vary, and that variation will make the sensor 209 output to vary. The controller 211 compares that new noise value with the initial reference value and will interpret the variation as a change in the operational status of the antenna 201. For example, if a person disconnects the antenna then the actual reading of the noise value will drop off and go below the stored noise reference value, and then the controller will determine that the antenna was disconnected.

The output of the antenna 201 connects to the Signal Booster or DAS Master Unit or DAS Remote Unit 207 through a coaxial cable. The coupler 215 allows part of the signal and white noise 205 received through the coaxial cable to be input into the power sensor 209.

In the event that the output of the power sensor 209 differs from the stored reference value (the integrated power of the white noise is expected to be constant for systems with a large operational bandwidth), the control unit 211 generates an alarm output 213 that can be implemented by a dry contact operation, a visual indicator like a LED, an SNMP trap, or any other method. The alarm 213 generated by the controller unit 211 in the Signal Booster or DAS Master Unit or DAS Remote Unit 207 may be communicated to an external destination, such as a fire alarm box or others. The reference value may be programmed or set by the installer of the coverage extension system or the system's owner. The control unit 211 can measure the noise when the antenna 201 is connected and compare it with the reference level. The reference level may be set as a threshold value that is between the reading with the noise coming from the antenna 201, and the reading when there is no antenna connected hence there is no noise being captured.

Figure 3:
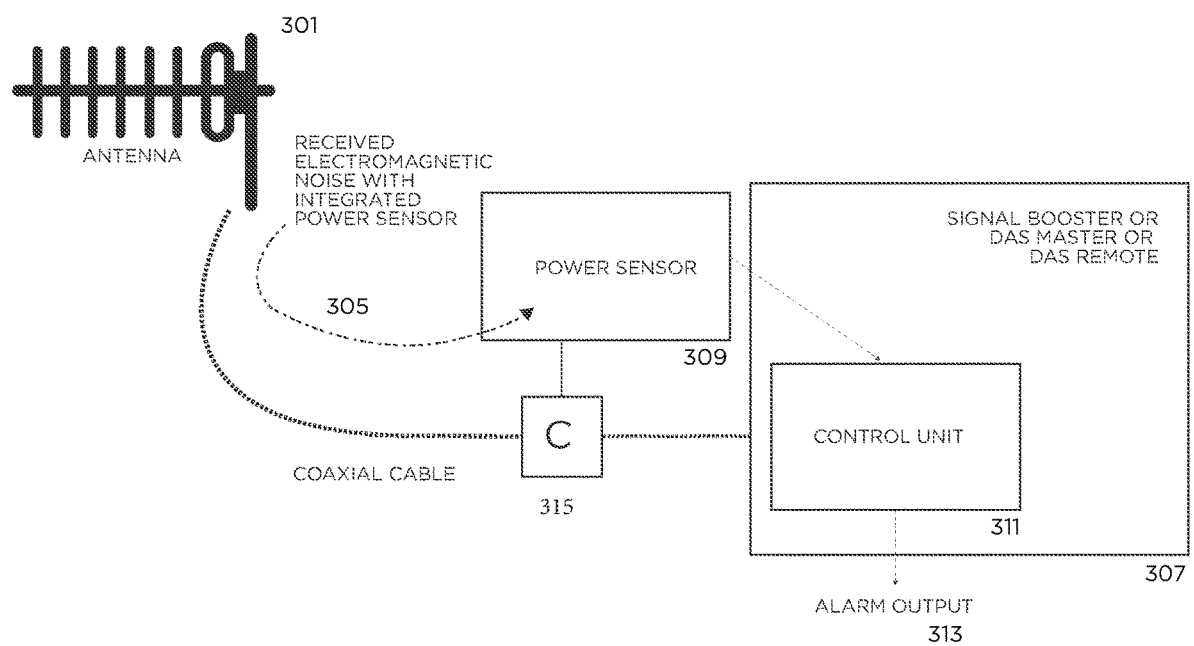
FIG. 3 illustrates the coverage extension system of FIG. 2 but with the power sensor positioned externally.

FIG. 3 shows the system of FIG. 2 but with the power sensor 309 positioned as an external component connected to the Signal Booster or DAS Master Unit or DAS Remote Unit 307, where the power sensor 309 receives part of the received electromagnetic noise 305 integrated power by coupling to the antenna line (through use of coupler 315, for example), and where the coupler 315 can be an external component of the power sensor 309 or can be an internal component of it. The coupler 315 may be used to avoid affecting the performance of the main extension coverage system. That is, the coupler may be used to avoid taking too much power away from the system signals.

Figure 4:
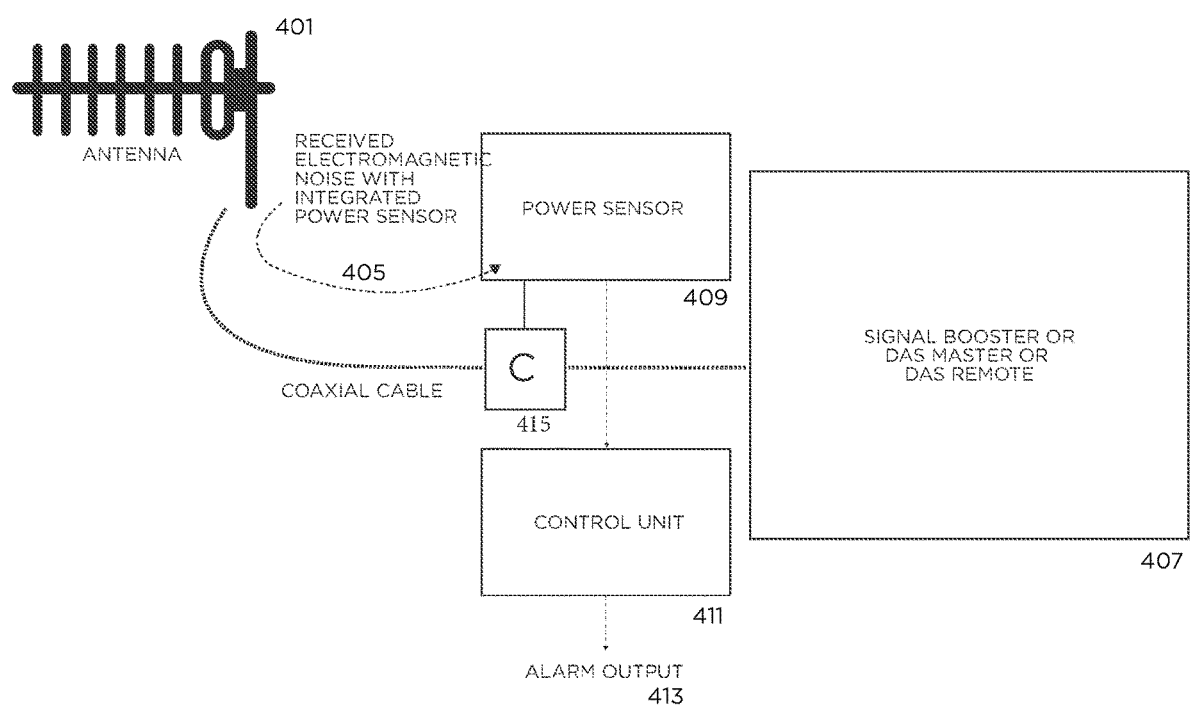
FIG. 4 illustrates the coverage extension system of FIG. 3 but with the control unit positioned externally.

FIG. 4 shows the system of FIG. 3 but with the power sensor 409 and the control unit 411 positioned as external components to the Signal Booster or DAS Master Unit or DAS Remote Unit 407.

The power sensor 409 and/or the control unit 411 can be part of the Signal Booster or DAS Master Unit or DAS Remote Unit 407, with independent circuitry, or can be embedded into the same Signal Booster or DAS Master Unit or DAS Remote Unit circuitry. Also, the power sensor 409 and/or control unit 411 can be embedded into a DSP or FPGA with one or many front end Analog to Digital Converters (ADCs). That is, the power sensor 409 and the control unit 411 can be programmed into a DSP, an FPGA or a microcontroller, or any other logical programmable device, via a front end ADC or other type of RF converter device.

The power sensor 409 can have one or many dedicated RF antenna ports, instead of being coupled with at least one of the Signal Booster or DAS Master Unit or DAS Remote Unit antenna ports. If the Signal Booster or DAS Master Unit or DAS Remote Unit 407 has more than one antenna ports, it may have a single power sensor to measure the white noise integrated power incoming to all the antenna ports, or may have multiple power sensors to measure multiple antenna ports.

The reference value of the control unit can be fixed or can be adjusted by the system administrator to provide the flexibility to accommodate the system to work properly on low congested RF environments. That is, the reference value may be set initially at the time of manufacture of the power sensor, can be adjusted at any time, or set at the time of installation.

The descriptions set forth above are meant to be illustrative and not limiting. Various modifications to the disclosed embodiments, in addition to those described herein, will be apparent to those skilled in the art from the foregoing description. Such modifications are also intended to fall within the scope of the concepts described herein. The disclosures of each patent, patent application, and publication cited or described in this document are hereby incorporated herein by reference, in their entireties.

The foregoing description of possible implementations consistent with the present disclosure does not represent a list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims. Further, the limitations of the following claims are not written in means—plus-function format and are not intended to be interpreted based on 35 U.S.C. 112(f), unless and until such claim limitations expressly use the phrase "means for" followed by a statement of function void of further structure.

What is claimed:

1. A system for detecting whether an antenna has been disconnected from a coverage extension system comprising:
    an antenna receiving signals from a base station and noise from the environment;
    a coupler;
    a transceiver;
    a power sensor to measure the power intensity of the noise;
    a controller; and
    a wired connector, electrically connecting the output of the antenna to said coupler, for carrying said signals and noise from said antenna to said coupler;
        wherein the coupler outputs part of the signals and noise to said power sensor and another part of the signals and noise to the transceiver; and
        wherein the controller detects changes in the power intensity of the noise to detect whether the antenna has been disconnected.

2. The system of claim 1, wherein said transceiver comprises a bidirectional amplifier.

3. The system of claim 1, wherein said transceiver comprises a master unit of a distributed antenna system.

4. The system of claim 1, wherein said transceiver comprises a remote unit of a distributed antenna system.

5. The system of claim 1, wherein said controller detects changes in the power intensity of the noise to detect whether the antenna has been disconnected by comparing measured power intensity of the noise with a reference value.

6. The system of claim 5, wherein said reference value is set at the time of installation of the coverage extension system by using as a reference power intensity of the noise received by the antenna when the antenna is connected to the coverage extension system.

7. The system of claim 1, wherein the controller generates an alarm signal when it detects changes in the power intensity of the noise to detect whether the antenna has been disconnected.

8. The system of claim 7, wherein the alarm signal is fed to a dry contact, a visual indicator, or a Simple Network Management Protocol (SNMP) trap.

9. The system of claim 8, wherein the visual indicator is a light emitting diode (LED).

10. The system of claim 7, wherein the alarm signal is transmitted to a remote unit separate from the coverage extension system.

11. The system of claim 10, wherein said remote unit comprises a fire alarm box.

12. The system of claim 1, wherein the coupler is integrated with the power sensor.

13. The system of claim 1, wherein the power sensor is integrated with the transceiver.

14. The system of claim 1, wherein the controller is integrated with the transceiver.

15. The system of claim 1, wherein said connector is a coaxial cable.

* * * * *